US012645814B2

(12) United States Patent
Shamsi et al.

(10) Patent No.: US 12,645,814 B2
(45) Date of Patent: Jun. 2, 2026

(54) ENCRYPTED SIDE-BAND COMMUNICATIONS

(71) Applicant: Hewlett-Packard Development Company, L.P., Spring, TX (US)

(72) Inventors: Osaid Ahmed Shamsi, Spring, TX (US); Roger D. Benson, Spring, TX (US); Abu Baker, Spring, TX (US); William P. Swaney, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 30 days.

(21) Appl. No.: 18/702,609

(22) PCT Filed: Nov. 30, 2021

(86) PCT No.: PCT/US2021/061265
§ 371 (c)(1),
(2) Date: Apr. 18, 2024

(87) PCT Pub. No.: WO2023/101660
PCT Pub. Date: Jun. 8, 2023

(65) Prior Publication Data
US 2024/0419820 A1     Dec. 19, 2024

(51) Int. Cl.
G06F 21/60 (2013.01)
G06F 21/32 (2013.01)
G06F 21/85 (2013.01)

(52) U.S. Cl.
CPC ............ G06F 21/606 (2013.01); G06F 21/32 (2013.01); G06F 21/85 (2013.01)

(58) Field of Classification Search
CPC ........ G06F 21/606; G06F 21/32; G06F 21/85; G06F 21/34
See application file for complete search history.

(56) References Cited

U.S. PATENT DOCUMENTS

| | | | |
|---|---|---|---|
| 6,473,825 B1 | 10/2002 | Worley et al. | |
| 6,735,660 B1 | 5/2004 | Osten et al. | |

(Continued)

FOREIGN PATENT DOCUMENTS

| | | |
|---|---|---|
| CN | 207069214 U | 3/2018 |
| JP | 2002-112332 A | 4/2002 |

(Continued)

OTHER PUBLICATIONS

"USB-C devices can now have safety, authenticity verified with new certification program", Apr. 13, 2016, AppleInsider, 12 pages.

(Continued)

*Primary Examiner* — Pramila Parthasarathy
(74) *Attorney, Agent, or Firm* — Quarles & Brady LLP

(57) ABSTRACT

In some examples, an electronic device includes a port and a controller. The controller compares an encrypted identifier received via a side-band communications channel of the port to a trusted identifier retrieved from a storage device. Responsive to the encrypted identifier being equivalent to the trusted identifier, the controller compares an encrypted user credential received via the port to a trusted user credential retrieved from the storage device. Responsive to the encrypted user credential being equivalent to the trusted user credential, the controller enables a user access to the electronic device.

20 Claims, 6 Drawing Sheets

100

(56) References Cited

U.S. PATENT DOCUMENTS

| | | |
|---|---|---|
| 7,953,670 B2 | 5/2011 | Colella |
| 8,386,795 B2 | 2/2013 | Lu et al. |
| 9,734,317 B2 | 8/2017 | Cannon et al. |
| 10,599,911 B2 | 3/2020 | Ryshtun et al. |
| 10,621,584 B2 | 4/2020 | Thatte et al. |
| 2005/0160196 A1 | 7/2005 | Dutton et al. |
| 2008/0148059 A1 | 6/2008 | Shapiro |
| 2009/0049307 A1 | 2/2009 | Lin |
| 2012/0131353 A1 | 5/2012 | Nasir et al. |
| 2014/0282965 A1 | 9/2014 | Sambamurthy et al. |
| 2014/0337558 A1 | 11/2014 | Powers et al. |
| 2015/0331043 A1 | 11/2015 | Sastry et al. |
| 2016/0170914 A1 | 6/2016 | Pethe et al. |
| 2016/0378971 A1 | 12/2016 | Dunstan |
| 2018/0007032 A1 | 1/2018 | Pappu et al. |
| 2019/0109713 A1 | 4/2019 | Clark et al. |
| 2019/0158277 A1 | 5/2019 | Edgecombe et al. |
| 2021/0044976 A1 | 2/2021 | Avetisov et al. |
| 2021/0306335 A1 | 9/2021 | Avetisov et al. |
| 2024/0020393 A1* | 1/2024 | Mehta .................... G06F 21/32 |

FOREIGN PATENT DOCUMENTS

| | | |
|---|---|---|
| JP | 2005-117430 A | 4/2005 |
| WO | 2020/055419 A1 | 3/2020 |

OTHER PUBLICATIONS

Dana Neustadter, "Ensuring Content Protection over USB Type-C", 2018, Synopsys, 8 pages.

Gayathri Vasudevan, "All about USB Type-C Docking Stations: Part II", May 15, 2018, eeweb.com, 1 page.

J. Tian et.al, Sok "Plug & Pray" Today—Understanding USB Insecurity in Versions 1 through C, May 2018, kumarde.com, 16 pages.

Paul Pickering "Protect USB Ports From Nefarious USB Killers", Bench Talk to Design Engineers, Mouser.com, Apr. 11, 2018, 2 pages.

Renesas Electronics Delivers R9J02G012 Controller That Enables Device-to-Device Authentication in Support of Safer USB Power Delivery Ecosystem, May 30, 2017, Renesas Research, 3 pages.

* cited by examiner

400

402
Controller

404
Port

406

408 — Receive an encrypted identifier

410 — Verify that the encrypted identifier is a trusted identifier

412 — Receive an encrypted user credential

414 — Verify that the encrypted user credential is a trusted user credential

416 — Enable, responsive to a successful verification, a user access

418 — Trusted Identifier

420 — Trusted User Credential

ENCRYPTED SIDE-BAND COMMUNICATIONS

BACKGROUND

Electronic devices such as desktops, laptops, notebooks, tablets, and smartphones enable user access responsive to authentication of user credentials. In some instances, a user enters a user credential via another electronic device coupled to the electronic device. The another electronic device includes a sensor for receiving the user credential, for instance.

BRIEF DESCRIPTION OF THE DRAWINGS

Various examples are described below referring to the following figures.

DETAILED DESCRIPTION

Figure 1:
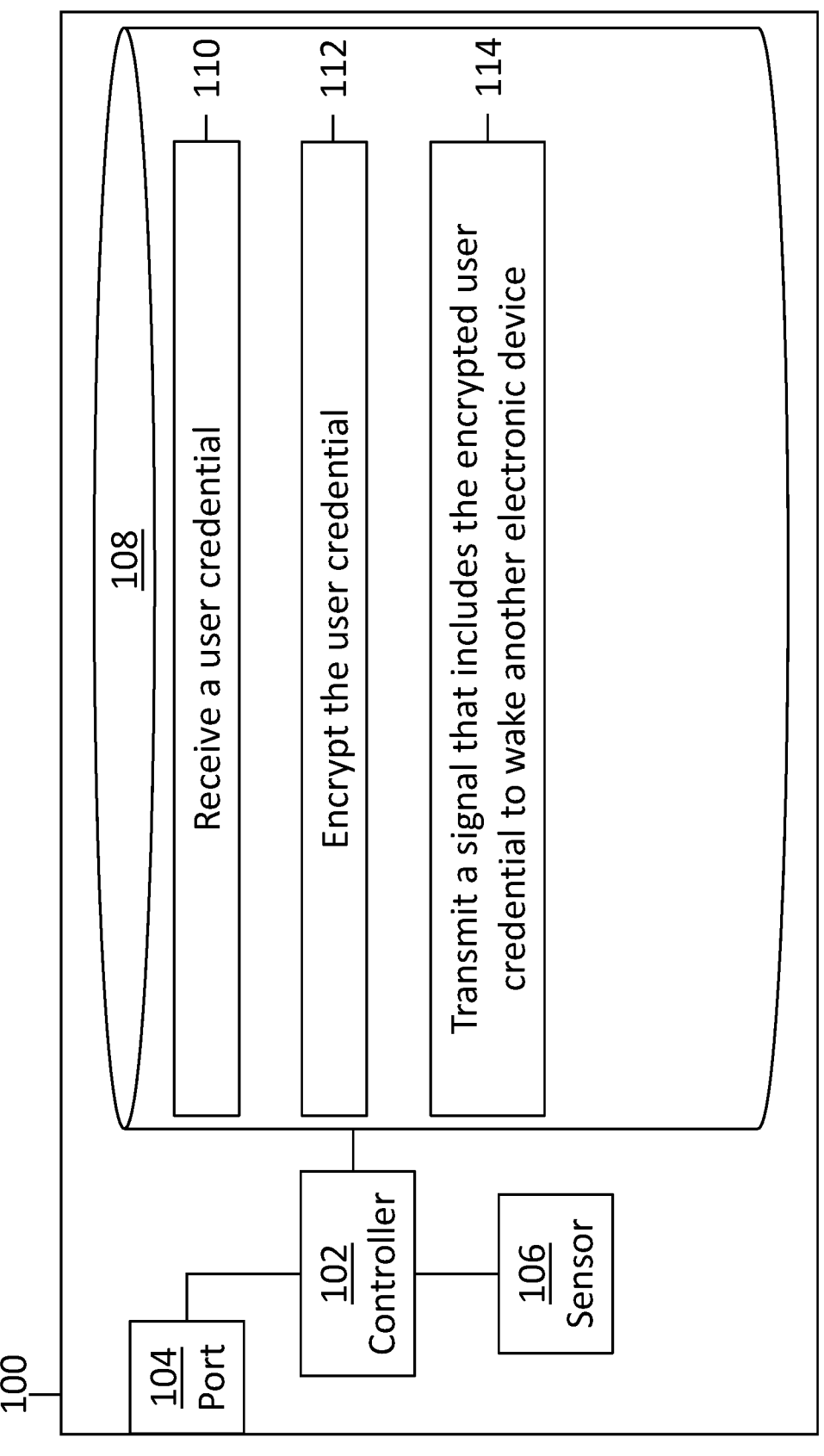
FIG. 1 is a block diagram depicting an electronic device utilizing encrypted side-band communication to authenticate user credentials, in accordance with various examples.

As described above, electronic devices enable user access responsive to authentication of user credentials. An electronic device is a desktop, a laptop, a notebook, a tablet, a smartphone, or any other computing device utilizing a user credential to enable access to the electronic device. In some instances, another electronic device transmits the user credential to the electronic device. In some examples, the another electronic device is referred to herein as a peripheral device because the another electronic device is an input device, an output device, or a combination thereof, for the electronic device. In various examples, the electronic device is referred to herein as a host device because the electronic device receives and processes the data transmitted by the peripheral device.

To receive the user credential from the peripheral device, the electronic device is to be in a wake state. The wake state, as used herein, is an operation state of the electronic device during which an operating system (OS) of the electronic device controls or operates the hardware devices of the electronic device. A standby state, as used herein, is an operation state of the electronic device during which the power consumption of the electronic device is lower than the wake state and from which the electronic device may enter the wake state without restarting the OS. To enable the wake state, a user interacts with a trusted peripheral device coupled to the electronic device. A trusted peripheral device, as used herein, indicates that credentials for the peripheral device are verified by the electronic device. The credentials are any suitable data that identifies the peripheral device to the electronic device. The credentials include an identifier of the peripheral device, for instance.

In various instances, to wake the electronic device, the user opens a lid of the electronic device to trigger a sensor, engages a power button of the electronic device, moves a mouse of the electronic device, enters a keystroke on a keyboard of the electronic device, or engages in any other suitable action with a peripheral device of the electronic device. The sensor associated with the lid, the power button, the mouse, the keyboard, or the combination thereof, are referred to herein as trusted peripheral devices responsive to being integrated peripheral devices of the electronic device having trusted identifiers, for instance. An integrated peripheral device, as used herein, is an input device, an output device, or a combination thereof, that is housed within a chassis of the electronic device. The housing of the integrated peripheral device within the chassis enhances a security of the peripheral device by reducing a likelihood of malicious third-party tampering being undetected. The user waking the electronic device utilizes user time and reduces user productivity.

In some instances, the peripheral device stores a trusted user credential to compare to the user credential. Storing the trusted user credential on the peripheral device increases a security risk. In various instances, a connection to the peripheral device is not secure and the trusted user credential is intercepted during transmission. In other instances, a security of the peripheral device is vulnerable to malicious third-party attacks that access the trusted user credential stored to the peripheral device. To reduce the security risk, in instances where the peripheral device is not an integrated peripheral device, each time the peripheral device is coupled to the electronic device, the peripheral device is to enroll as a trusted peripheral device of the electronic device. The enrollment is an involved process that utilizes user time and reduce user productivity.

This description describes electronic and peripheral devices that enable a user to enter user credentials without re-enrolling the peripheral device each time the peripheral device couples to the electronic device. The user inputs a user credential utilizing a biometric sensor, a scanner, or a combination thereof. The biometric sensor, as used herein, is any suitable device for receiving a physiological or behavioral characteristic of a user. The scanner, as used herein, is any suitable device for receiving information stored to an identification (ID) card. The information stored to the ID card includes the user credential, in various examples.

The peripheral device encrypts an identifier of the peripheral device and transmits, via a side-band communications channel of a port of the peripheral device, a signal that includes the encrypted identifier. The side-band communications channel, as used herein, is a customizable connection of the port by which the electronic device is to couple to the peripheral device. The customizable connection, as used herein, specifies that pins of the port operate according to a custom protocol, specifies a format for data transmitted between the electronic device and the peripheral device, or a combination thereof. A specification or standard provides operating guidelines for the port. For example, a Universal Serial Bus (USB) Type C port operates according to a Power Delivery (PD) specification. The USB Type C PD specification establishes a format for messages transmitted between the electronic device and the peripheral device. While the USB Type C PD specification enables the electronic device negotiate a power supplied to the peripheral device, in some examples, utilizing vendor defined messages (VDMs), the USB Type C PD specification enables the electronic device to customize connections of the port.

Utilizing the VDMS, a custom protocol is utilized to establish the side-band communications channel, for example. The custom protocol utilizes a key exchange in accordance with secure cryptography techniques, for example. The electronic device verifies the encrypted identifier by comparing the encrypted identifier to a trusted identifier stored to a storage device of the electronic device and determining that the encrypted identifier is equivalent to the trusted identifier. In various examples, the storage device is referred to herein as a secure storage device because the storage device is accessible via a private bus coupled directly to a controller of the electronic device and to no other component of the electronic device. The peripheral device encrypts the user credential and transmits a signal that includes the encrypted user credential. The electronic device receives the encrypted signal from the peripheral device. The electronic device verifies the encrypted user credential by comparing the encrypted user credential to a trusted user credential stored to the secure storage device. In some examples, the electronic device verifies the encrypted user credential by determining that the encrypted user credential is equivalent to the trusted user credential. In other examples, responsive to data of the encrypted user credential being within a specified threshold of data of the trusted user credential, the electronic device determines that the encrypted user credential is equivalent to the trusted user credential. In some examples, responsive to authentication of the encrypted user credential, the electronic device wakes the electronic device. Responsive to authentication of the encrypted user credential, the electronic device enables a user access to the electronic device.

By utilizing the secure storage device to store trusted identifiers, the electronic device enhances a number of trusted peripheral devices authorized to wake the electronic device to include non-integrated peripheral devices. By utilizing the side-band communications channel of the port to establish encrypted communication and the secure storage device to store trusted identifiers and trusted user credentials, the electronic device enhances user productivity by reducing an amount of time to wake from a sleep state and to authenticate the user. Additionally, the electronic device reduces security risks by utilizing the encrypted communication via the side-band communications channel of the port and the secure storage device, which has an access that is limited to the controller.

In some examples in accordance with the present description, an electronic device is provided. The electronic device includes a port and a controller. The controller compares an encrypted identifier received via a side-band communications channel of the port to a trusted identifier retrieved from a storage device. Responsive to the encrypted identifier being equivalent to the trusted identifier, the controller compares an encrypted user credential received via the port to a trusted user credential retrieved from the storage device. Responsive to the encrypted user credential being equivalent to the trusted user credential, the controller enables a user access to the electronic device.

In other examples in accordance with the present description, an electronic device is provided. The electronic device includes a controller to receive an encrypted identifier via a side-band communications channel of a port. The controller verifies that the encrypted identifier is equivalent to a trusted identifier that is stored on a storage device. Responsive to the encrypted identifier being equivalent to the trusted identifier, the controller receives an encrypted user credential via the port. The controller verifies that the encrypted user credential is equivalent to a trusted user credential that is stored on the storage device. Responsive to the encrypted user credential being equivalent to the trusted user credential, the controller enables a user access to the electronic device.

In yet other examples in accordance with the present description, an electronic device is provided. The electronic device includes a sensor, a port to couple to another electronic device, and a controller. The controller is to receive a user credential via the sensor, encrypt the user credential, and cause transmission, via a side-band communications channel of the port, a signal that includes the encrypted user credential. The signal is to wake the another electronic device.

Referring now to FIG. 1, a block diagram depicting an electronic device 100 utilizing encrypted side-band communication to authenticate user credentials is provided, in accordance with various examples. The electronic device 100 is a desktop, a laptop, a notebook, a tablet, a smartphone, or any other suitable computing device having a sensor 106 that enables a user to enter a user credential. The electronic device 100 is a docking station that includes the sensor 106, for example. The sensor 106 is any suitable sensor for receiving the user credential. The sensor 106 is a biometric sensor, a scanner, or a combination thereof, for example. The biometric sensor is an image sensor, a microphone, or a combination thereof, for example. The scanner is a radio frequency identification (RFID) reader, for example. The user credential is a fingerprint, a handprint, an iris scan, a retinal scan, a facial pattern, a voice pattern, an identifier stored to a card, or a combination thereof, for example.

In various examples, the electronic device 100 includes a controller 102, a port 104, the sensor 106, and a storage device 108. The controller 102 is a microprocessor, a microcomputer, a microcontroller, a programmable integrated circuit, a programmable gate array, or other suitable device for managing operations of the electronic device 100 or a component or multiple components of the electronic device 100. For example, the controller 102 is a central processing unit (CPU), a graphics processing unit (GPU), or an embedded security controller (EpSC). In another example, the controller 102 is a port controller that manages signals transmitted and received via the port 104. The port 104 is any suitable connector that enables coupling of the electronic device 100 to a host device. The port 104 is an Ethernet connector or a USB connector, for example. The storage device 108 is a hard drive, a solid-state drive (SSD), flash memory, random access memory (RAM), or other suitable memory for storing data or machine-readable instructions of the electronic device 100.

In some examples, the controller 102 is coupled to the port 104, the sensor 106, and the storage device 108. The port 104 is coupled to the controller 102. The sensor 106 is coupled to the controller 102. The storage device 108 is coupled to the controller 102. While the storage device 108 is shown as a separate component of the electronic device 100, in other examples, the storage device 108 is integrated with the controller 102.

In various examples, the storage device 108 stores machine-readable instructions, which, when executed, cause the controller 102 to perform some or all of the actions attributed herein to the controller 102. The machine-readable instructions are the machine-readable instructions 110, 112, 114. The machine-readable instructions 110, 112, 114, when executed by the controller 102, cause the controller 102 to utilize a side-band communications channel to authenticate a user credential. The user credential is to enable a user access to the host device (not explicitly shown) that is coupled to the port 104, for example. The machine-readable instruction 110, when executed by the controller 102, causes the controller 102 to receive a user credential. The user credential is received via the sensor 106, for example. The machine-readable instruction 112, when executed by the controller 102, causes the controller 102 to encrypt the user credential. The machine-readable instruction 114, when executed by the controller 102, causes the controller 102 to cause transmission of a signal that includes the encrypted user credential to wake the host device (not explicitly shown). The signal is transmitted via the side-band communications channel of the port 104, for example.

In various examples, as described above, the controller 102 establishes an encrypted communications channel with the host device via a side-band communications channel of the port 104. For example, responsive to detecting the host device coupled to the port 104, the controller 102 and the host device utilize a custom protocol to establish the encrypted communications channel via the side-band communications channel of the port 104. The side-band communications channel of the port 104 is a power delivery channel of a USB Type C port, for example. The custom protocol utilizes a key exchange in accordance with secure cryptography techniques, for example. In some examples, the controller 102 receives a signal from the host device via the side-band communications channel of the port 104. The signal is a challenge to the controller 102 to provide a second signal that indicates the controller 102 is able to communicate via the side-band communications channel of the port 104. The signal includes a first key, for example. In various examples, responsive to the signal, the controller 102 encrypts an identifier of the electronic device 100 utilizing the secure cryptography techniques. The identifier is a serial number or any other suitable alphanumeric indicator that is unique to the electronic device 100, for example. The controller 102 causes transmission of the second signal that includes the encrypted identifier. In other examples, responsive to the signal, the controller 102 causes transmission of the second signal that includes a second key. The second key is stored to an internal storage device (not shown) of the controller 102, for example.

In some examples, the controller 102 receives a signal via the side-band communications channel of the port 104. The signal includes an indicator that the host device is ready to receive a user credential. Responsive to the indicator, the controller 102 encrypts the user credential. The controller 102 causes transmission of a signal that includes the encrypted user credential via the side-band communications channel of the port 104. By utilizing the side-band communications channel of the port 104 to establish encrypted communication with the host device, the controller 102 enhances user productivity by reducing an amount of time to wake the host device and to authenticate the user.

Figure 2:
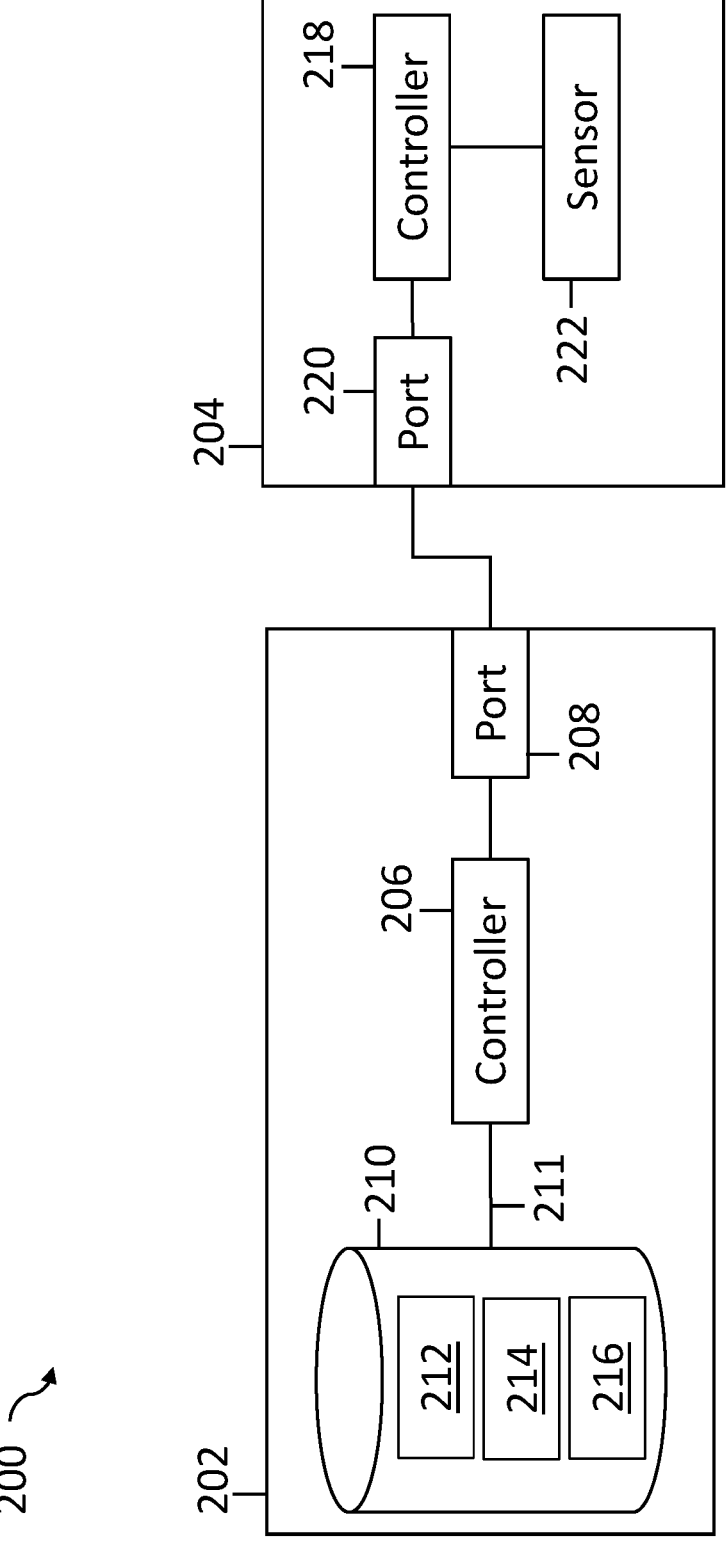
FIG. 2 is a block diagram depicting a system utilizing encrypted side-band communication to authenticate user credentials, in accordance with various examples.

Referring now to FIG. 2, a block diagram depicting a system 200 utilizing encrypted side-band communication to authenticate user credentials is provided, in accordance with various examples. The system 200 includes electronic devices 202, 204. An electronic device 202 is a desktop, a laptop, a notebook, a tablet, a smartphone, or any other computing device utilizing a user credential to enable access to the electronic device 202, for example. An electronic device 204 is a desktop, a laptop, a notebook, a tablet, a smartphone, or any other suitable computing device having a sensor 106 that enables a user to enter a user credential. The electronic device 204 is the electronic device 100, for example.

In various examples, the electronic device 202 includes a controller 206, a port 208, a storage device 210, and a path 211. The controller 206 is a microprocessor, a microcomputer, a microcontroller, a programmable integrated circuit, a programmable gate array, or other suitable device for managing operations of the electronic device 202 or a component or multiple components of the electronic device 202. For example, the controller 206 is a CPU, a GPU, or an EpSC. In another example, the controller 206 is a port controller that manages signals transmitted and received via the port 208. The port 208 is any suitable connector that enables coupling of the electronic device 202 to the electronic device 204. The port 208 is an Ethernet connector or a USB connector, for example. The storage device 210 is a hard drive, a SSD, flash memory, RAM, or other suitable memory for storing data or machine-readable instructions of the electronic device 202. The path 211 is any suitable bus utilized to transfer data between components coupled to the bus. The path 211 is a serial peripheral interface (SPI), for example. In other examples, the path 211 is an interface that operates according to another specification or standard that enables data transfers (e.g., Inter-Integrated Circuit (I2C), Improved Inter-Integrated Circuit (I3C), Peripheral Component Interconnect (PCI)). In some examples, the electronic device 204 includes a controller 218, a port 220, and a sensor 222. The controller 218 is the controller 102, for example. The port 220 is the port 104, for example. The sensor 222 is the sensor 106, for example.

In some examples, the controller 206 is coupled to the storage device 210 via the path 211 and to the port 208. The port 208 is coupled to the controller 206. The storage device 210 is coupled to the controller 206 via the path 211. In various examples, the storage device 210 is coupled to the controller 206 via the path 211 that is private. A private path, as utilized herein, is a communication bus that couples the components directly, with no intermediate connections, and to which no other component of the electronic device 202 couples. For example, the storage device 210 is coupled to the controller 206 via a private SPI. While the storage device 210 is shown as a separate component of the electronic device 202, in other examples, the storage device 210 is integrated with the controller 206. The components of the electronic device 204 are coupled as described above with respect to FIG. 1, for example.

In various examples, the storage device 210 stores data of the electronic device 202 and machine-readable instructions, which, when executed, cause the controller 206 to perform some or all of the actions attributed herein to the controller 206. The data and machine-readable instructions are the memory locations 212, 214, 216, for example. The memory location 212 stores a key, for example. The key is a first key of a custom protocol that utilizes a key exchange in accordance with secure cryptography techniques, for example. In another example, the memory location 212 stores a machine-readable instruction. The memory location 214 is a memory location storing a trusted identifier, for example. In another example, the memory location 214 is a machine-readable instruction. The memory location 216 is a memory location storing a trusted user credential, for example. In another example, the memory location 216 is a machine-readable instruction.

In some examples, the memory locations 212, 214, 216 store trusted identifiers for respective trusted peripheral devices. For example, the memory location 212 stores a first trusted identifier for a first trusted peripheral device, the memory location 214 stores a second trusted identifier for a second trusted peripheral device, and the memory location 216 stores a third trusted identifier for a third trusted peripheral device. In other examples, the memory locations 212, 214, 216 store trusted user credentials. The trusted user credentials are different user credentials for a same user, in some examples. For example, a first trusted user credential is a voice pattern, a second trusted user credential is an iris pattern, and a third trusted user credential is a personal identification number (PIN) for a single user. In other examples, the trusted user credentials are user credentials for multiple, different users. For example, a first trusted user credential is a fingerprint for a first user, a second trusted user credential is a voice pattern for a second user, and a third trusted user credential is a PIN for a third user.

As described above, the electronic devices 202, 204 enable a user to enter a user credential without re-enrolling the electronic device 204 each time the electronic device 204 couples to the electronic device 202. The electronic device 202 and the electronic device 204 couple via the ports 208, 220, for example. The ports 208, 220 are USB Type C ports, for example. In various examples, the user inputs a user credential utilizing the sensor 222, for example. As described above with respect to FIG. 1, in some examples, responsive to receiving the user credential, the controller 218 encrypts an identifier of the electronic device 204 and causes transmission, via the side-band communications channel of the port 220, a signal that includes the encrypted identifier. The signal is to establish a side-band communications channel with the electronic device 202, for example. The controller 206 verifies the encrypted identifier by comparing the encrypted identifier to a trusted identifier stored to the storage device 210 and determining that the encrypted identifier is equivalent to the trusted identifier.

In some examples, responsive to establishment of the side-band communications channel, the controller 218 encrypts the user credential and causes transmission, via the side-band communications channel of the port 220, a signal that includes the encrypted user credential. The controller 206 receives the encrypted signal via the side-band communications channel of the port 208. The controller 206 verifies the encrypted user credential by comparing the encrypted user credential to a trusted user credential stored to the storage device 210. In various examples, the controller 206 verifies the encrypted user credential by determining that the encrypted user credential is equivalent to the trusted user credential. In other examples, responsive to data of the encrypted user credential being within a specified threshold of data of the trusted user credential, the controller 206 determines that the encrypted user credential is equivalent to the trusted user credential. Responsive to authentication of the encrypted user credential, the controller 206 wakes the electronic device 202 and enables the user to access to the electronic device 202.

In various examples, a trusted identifier is associated with a user credential. For example, a first trusted identifier is associated with a first set of multiple user credentials of users with authorization to utilize the electronic device 202, the electronic device 204, or a combination thereof. A second trusted identifier is associated with a second set of multiple user credentials. In various examples, the first set of multiple user credentials does not include any user credential of the second set of multiple user credentials. In other examples, the first set of multiple user credentials includes a subset of the second set of multiple user credentials. Responsive to a determination that the encrypted identifier is equivalent to the trusted identifier, the controller 206 utilizes the set of multiple user credentials associated with the trusted identifier to verify the encrypted user credential.

By utilizing the storage device 210 to store trusted identifiers and that has an accessibility limited to the controller 206 via a private communications bus, the controller 206 enhances a number of trusted peripheral devices (e.g., to include the electronic device 204) authorized to wake the electronic device 202. By utilizing the side-band communications channel of the port 208 to establish encrypted communication and the storage device 210 to store trusted identifiers and trusted user credentials, the controller 206 enhances user productivity by reducing an amount of time to wake the electronic device 202 and to authenticate the user. Additionally, the controller 206 reduces security risks by utilizing the encrypted communication via the side-band communications channel of the port 208 and the storage device 210 having an accessibility that is limited to the controller 206.

Figure 3:
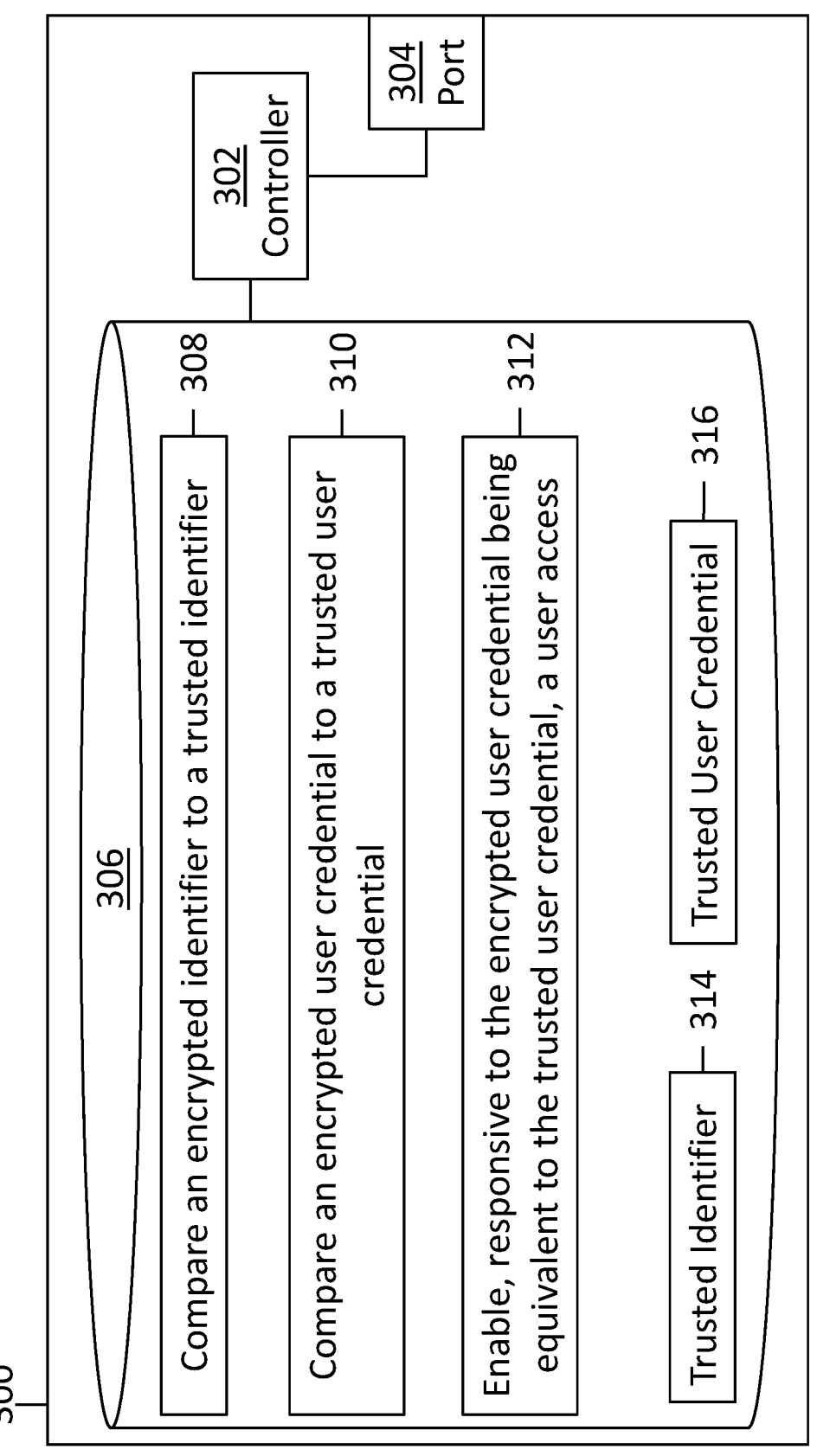
FIG. 3 is a block diagram depicting an electronic device utilizing encrypted side-band communication to authenticate user credentials, in accordance with various examples.

Referring now to FIG. 3, a block diagram depicting an electronic device 300 utilizing encrypted side-band communication to authenticate user credentials is provided, in accordance with various examples. The electronic device 300 is the electronic device 202, for example. The electronic device 300 includes a controller 302, a port 304, and a storage device 306. The controller 302 is the controller 206, for example. The port 304 is the port 208, for example. The controller 302, the port 304, and the storage device 306 are coupled as described above with respect to FIG. 2, for example.

In various examples, the storage device 306 stores data of the electronic device 300 and machine-readable instructions, which, when executed, cause the controller 302 to perform some or all of the actions attributed herein to the controller 302. The data includes a trusted identifier 314 and a trusted user credential 316, for example. In some examples, the trusted identifier 314 and the trusted user credential 316 are the memory locations 214, 216, for example. The machine-readable instructions are the machine-readable instructions 308, 310, 312, for example. In some examples, the machine-readable instructions 308, 310, 312 are the memory locations 212, 214, 216, for example.

In some examples, the machine-readable instructions 308, 310, 312, when executed by the controller 302, cause the controller 302 to utilize a side-band communications channel to authenticate a user credential. The side-band communications channel is a side-band communications channel of the port 304, for example. The machine-readable instruction 308, when executed by the controller 302, causes the controller 302 to compare an encrypted identifier to the trusted identifier 314. The encrypted identifier is received from a peripheral device (e.g., the electronic device 100, 204) communicatively coupled to the electronic device 300 via the side-band communications channel of the port 304, for example. Responsive to the comparison indicating that the encrypted identifier is equivalent to the trusted identifier 314, the machine-readable instruction 310, when executed by the controller 302, causes the controller 302 to compare an encrypted user credential to the trusted user credential 316. The machine-readable instruction 312, when executed by the controller 302, causes the controller 302 to enable, responsive to the encrypted user credential being equivalent to the trusted user credential 316, the user access to the electronic device 300.

In various examples, the controller 302 detect another electronic device coupled to the port 304. The another electronic device is the peripheral device, for example.

Responsive to detecting the another electronic device, the controller 302 causes transmission of a signal to the another electronic device via the side-band communications channel of the port 304. The signal is to challenge the another electronic device to provide the encrypted identifier, for example.

In other examples, as described above with respect to FIG. 1, responsive to detecting the peripheral device coupled to the port 304, the controller 302 utilizes a custom protocol to establish an encrypted communications channel with the peripheral device via the side-band communications channel of the port 304. The side-band communications channel of the port 304 is a power delivery channel of a USB Type C port, for example. The custom protocol utilizes a key exchange in accordance with secure cryptography techniques, for example. In some examples, the controller 302 causes transmission of a signal to challenge the peripheral device to provide a second signal via the side-band communications channel of the port 304. The signal includes a first key of a custom protocol that utilizes a key exchange in accordance with secure cryptography techniques, as described above with respect to FIG. 2, for example. The first key is stored to the storage device 306, for example. In various examples, responsive to receiving the second signal via the side-band communications channel of the port 304, the controller 302 verifies that the second signal includes a second key of the custom protocol. Responsive to a verification that the second signal includes the second key of the custom protocol, the controller 302 determines that an encrypted side-band communications channel is established via the port 304.

In some examples, responsive to establishment of the encrypted side-band communications channel via the port 304, the controller 302 causes transmission of a signal that includes a command for the peripheral device to transmit an identifier of the peripheral device. The controller 302 receives a signal via the encrypted side-band communications channel of the port 304. The signal includes an encrypted identifier, for example. In various examples, utilizing the secure cryptography techniques, the controller 302 decrypts the encrypted identifier. In other examples, the controller 302 decrypts the encrypted user credential utilizing the secure cryptography techniques.

As described above, responsive to data of the encrypted user credential being within a specified threshold of data of the trusted user credential 316, the controller 302 determines that the encrypted user credential is equivalent to the trusted user credential 316. In various examples, the encrypted user credential includes a fingerprint, a handprint, an iris scan, a retinal scan, a facial pattern, a voice pattern, or a combination thereof. For example, responsive to a determination that an encrypted fingerprint pattern shares a threshold percentage of features with a trusted fingerprint pattern, the controller 302 determines that the encrypted fingerprint pattern is equivalent to the trusted fingerprint pattern.

In various examples, a manufacturer of the electronic device 300 specifies the specified threshold at a time of manufacture. In other examples, a manufacturer of the peripheral device, a sensor of the peripheral device, or a combination thereof, specifies the specified threshold. In some examples, the specified threshold is specified post-manufacture. For example, an owner or administrator (e.g., such as an owner's representative) of the electronic device 300, the peripheral device, or a combination thereof, specifies the specified threshold. The owner or administrator utilizes a graphical user interface (GUI) to specify the specified threshold, for example.

Figure 4:
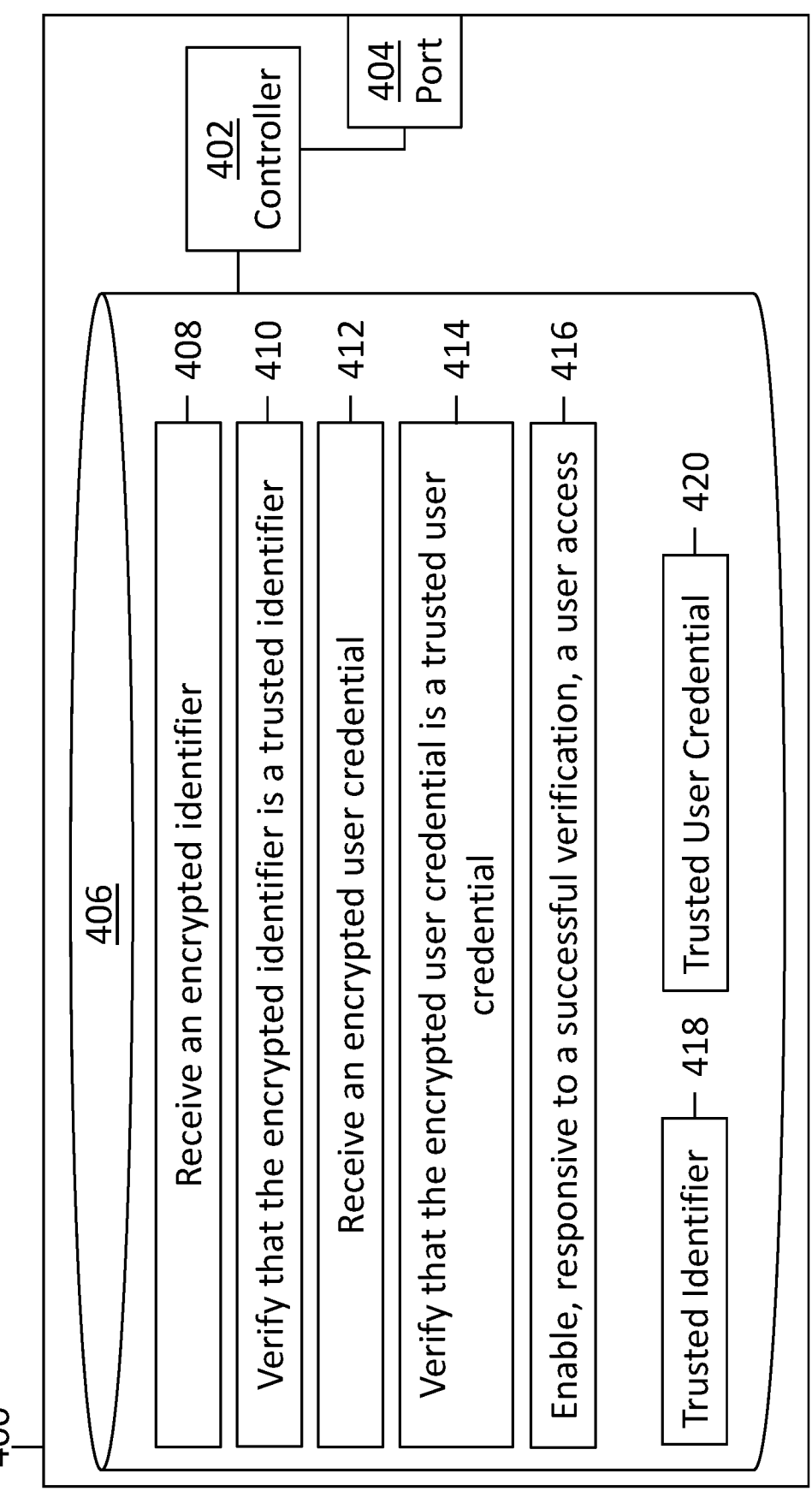
FIG. 4 is block diagram depicting an electronic device utilizing encrypted side-band communication to authenticate user credentials, in accordance with various examples.

Referring now to FIG. 4, a block diagram depicting an electronic device 400 utilizing encrypted side-band communication to authenticate user credentials is provided, in accordance with various examples. The electronic device 400 is the electronic device 300, 202, for example. The electronic device 400 includes a controller 402, a port 404, and a storage device 406. The controller 402 is the controller 206, 302, for example. The port 404 is the port 208, 304, for example. The storage device 406 is the storage device 210, 306, for example. In various examples, the controller 402, the port 404, and the storage device 406 are coupled as described above with respect to FIG. 2 or 3.

In various examples, the storage device 406 stores data of the electronic device 400 and machine-readable instructions, which, when executed, cause the controller 402 to perform some or all of the actions attributed herein to the controller 402. The data includes a trusted identifier 418 and a trusted user credential 420, for example. In some examples, the trusted identifier 418 and the trusted user credential 420 are the trusted identifier 314 and the trusted user credential 316, respectively, or the memory locations 214, 216, respectively. The machine-readable instructions are the machine-readable instructions 408, 410, 412, 414, 416, for example. In some examples, the machine-readable instructions 408, 410, 412, 414, 416 are the memory locations 212, 214, 216, for example.

In some examples, the machine-readable instructions 408, 410, 412, 414, 416, when executed by the controller 402, cause the controller 402 to utilize a side-band communications channel to authenticate a user credential. The machine-readable instruction 408, when executed by the controller 402, causes the controller 402 to receive an encrypted identifier. The encrypted identifier is received via the side-band communications channel of the port 404, for example. The machine-readable instruction 410, when executed by the controller 402, cause the controller 402 to verify that the encrypted identifier is the trusted identifier 418. Responsive to the verification that the encrypted identifier is equivalent to the trusted identifier 418, the machine-readable instruction 412, when executed by the controller 402, causes the controller 402 to receive an encrypted user credential. The machine-readable instruction 414, when executed by the controller 402, causes the controller 402 to verify that the encrypted user credential is the trusted user credential 420. The encrypted user credential is received via the side-band communications channel of the port 404, for example. The machine-readable instruction 416, when executed by the controller 402, causes the controller 402 to enable, responsive to a successful verification, the user access.

In various examples, the controller 402 detects a peripheral device (not explicitly shown) coupled to the port 404. The peripheral device is the electronic device 100, 204, for example. The controller 402 causes transmission of a signal to the peripheral device via the side-band communications channel of the port 404. The signal is to challenge the peripheral device to provide a second signal that indicates the peripheral device is able to communicate via the side-band communications channel of the port 404. The controller 402 receives, responsive to the challenge, the second signal via the port 404. Responsive to receipt of the second signal, the controller 402 causes transmission of a third signal to the peripheral device via the side-band communications channel of the port 404. The third signal a request for an identifier of the peripheral device. In some examples, responsive to receipt of the second signal, the controller 402 determines that the peripheral device is a trusted peripheral device.

In some examples, responsive to verification that the encrypted identifier is equivalent to the trusted identifier 418, the controller 402 determines that the peripheral device is a trusted peripheral device. In various examples, responsive to verification that the encrypted identifier is equivalent to the trusted identifier 418, the controller 402 causes transmission of a signal via the side-band communications channel of the port 404. The signal is to request the encrypted user credential. In some examples, responsive to verification that the encrypted identifier is equivalent to the trusted identifier 418, the controller 402 is to wake the electronic device 400.

Figure 5:
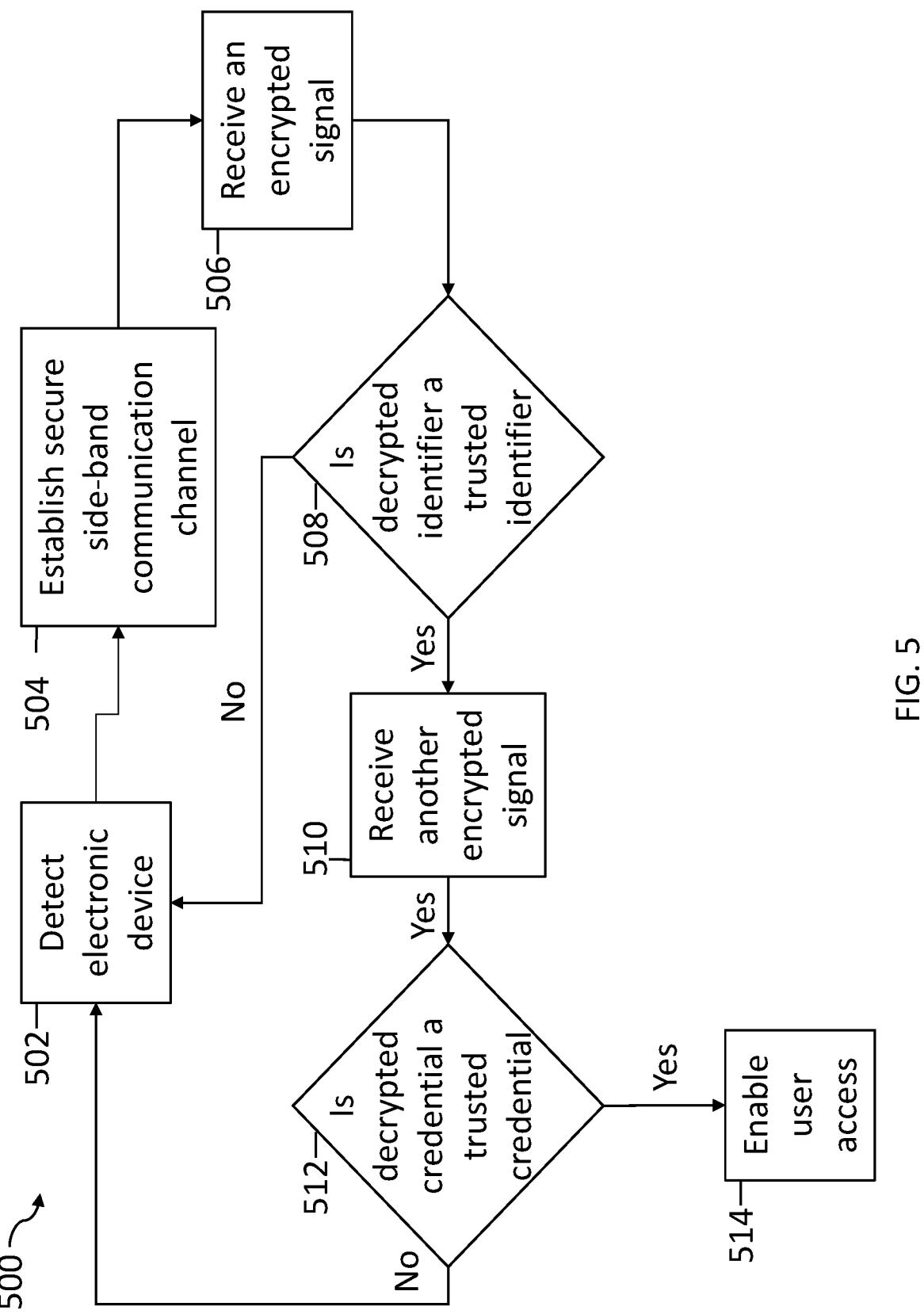
FIG. 5 is a flow diagram depicting a method for an electronic device utilizing encrypted side-band communication to authenticate user credentials, in accordance with various examples.

Referring now to FIG. 5, a flow diagram depicting a method 500 for an electronic device utilizing encrypted side-band communication to authenticate user credentials is provided, in accordance with various examples. The electronic device is the electronic device 202, 300, 400, for example. The method 500 includes detecting another electronic device (502). The another electronic device is the electronic device 100, 204, for example. The method 500 also includes establishing a side-band communications channel (504). Additionally, the method 500 includes receiving an encrypted signal (506). The method 500 includes determining whether a decrypted identifier of the encrypted signal is a trusted identifier (e.g., the trusted identifier 314, 418) (508). Responsive to a determination that the decrypted identifier is not the trusted identifier, the method 500 returns to detecting another electronic device (502). Responsive to a determination that the decrypted identifier is the trusted identifier, the method 500 includes receiving another encrypted signal (510). Additionally, the method 500 includes determining whether a decrypted credential of the another encrypted signal is a trusted credential (e.g., the trusted user credential 316, 420) (512). Responsive to a determination that the decrypted credential is not a trusted credential, the method 500 returns to detecting another electronic device (502). Responsive to a determination that the decrypted credential is the trusted credential, the method 500 includes enabling user access (514) to the electronic device.

In various examples, the method 500 includes detecting the another electronic device via a port (e.g., the port 208, 304, 404). The method 500 also includes establishing the side-band communications channel via the port utilizing the techniques described above with respect to FIG. 1 or 3, for example. The method 500 includes receiving the encrypted signal via the port. The method 500 includes decrypting the encrypted signal utilizing the techniques described above with respect to FIG. 3, for example. In some examples, the method 500 includes determining whether the decrypted identifier of the encrypted signal is the trusted identifier by comparing the decrypted identifier to the trusted identifier stored to a storage device (e.g., the storage device 210, 306, 406). The method 500 includes receiving the another encrypted signal via the port. Additionally, the method 500 includes decrypting the another encrypted signal utilizing the techniques described above with respect to FIG. 3, for example. In some examples, the method 500 includes determining whether the decrypted credential of the another encrypted signal is the trusted credential by comparing the decrypted credential to the trusted credential stored to the storage device (e.g., the storage device 210, 306, 406).

Figure 6:
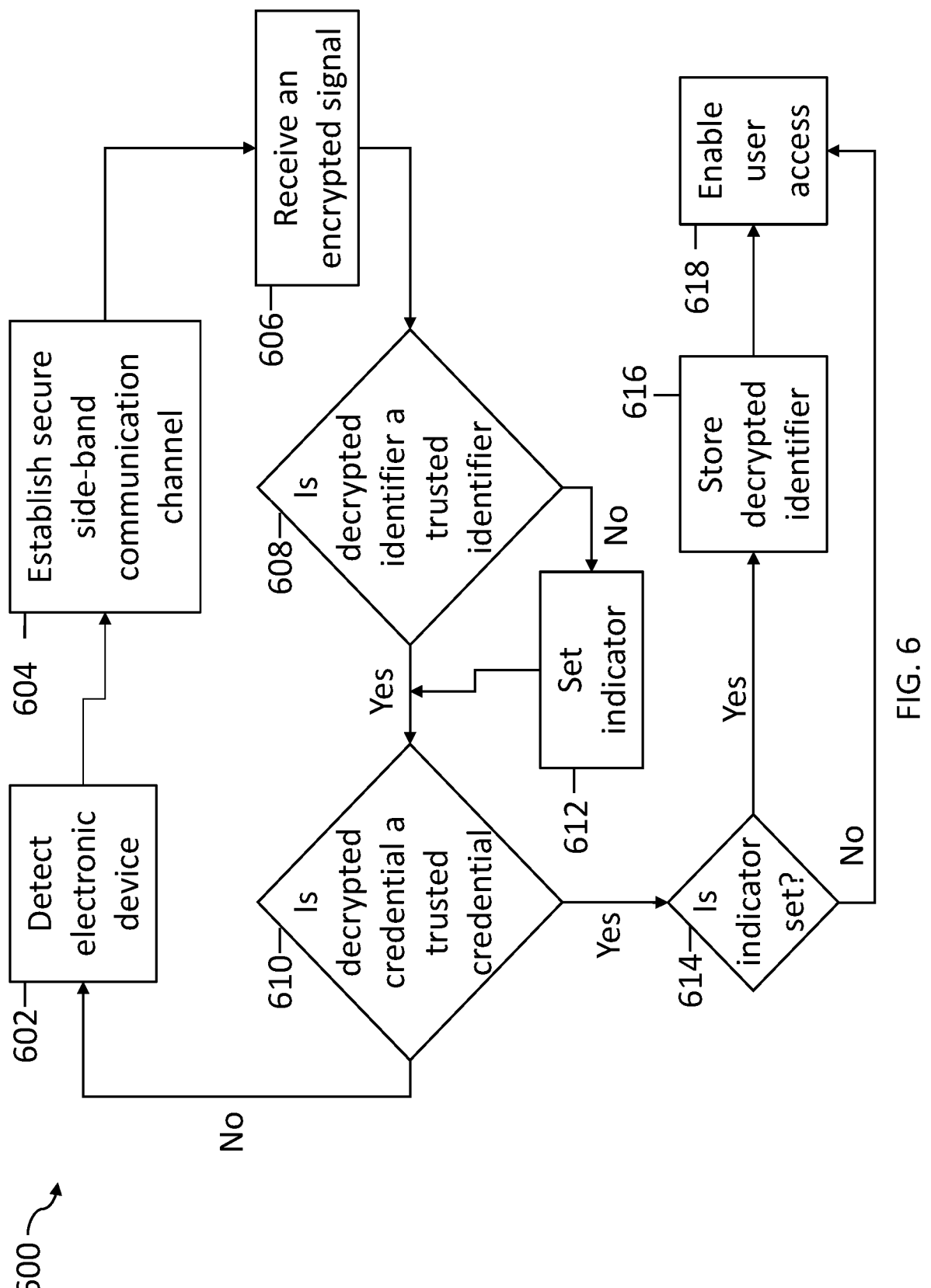
FIG. 6 is a flow diagram depicting a method for an electronic device utilizing encrypted side-band communication to authenticate user credentials, in accordance with various examples.

Referring now to FIG. 6, a flow diagram depicting a method 600 for an electronic device utilizing encrypted side-band communication to authenticate user credentials is provided, in accordance with various examples. The electronic device is the electronic device 202, 300, 400, for example. The method 600 includes detecting another electronic device (602). The another electronic device is the electronic device 100, 204, for example. The method 600 also includes establishing a side-band communications channel (604). The side-band communications channel is established utilizing the techniques described above with respect to FIG. 1 or 3, for example. Additionally, the method 600 includes receiving an encrypted signal (606). The method 600 includes determining whether a decrypted identifier is a trusted identifier (608). Responsive to a determination that the decrypted identifier is the trusted identifier, the method 600 includes determining whether a decrypted credential is a trusted credential (610). Responsive to a determination that the decrypted identifier is not the trusted identifier, the method 600 includes setting an indicator (612). The indicator is a flag that notifies the electronic device that the identifier is not a trusted identifier. The method 600 determines whether the decrypted credential is the trusted credential (610).

Responsive to a determination that the decrypted credential is not the trusted credential, the method 600 returns to detect another electronic device (602). Responsive to a determination that the decrypted credential is the trusted credential, the method 600 includes determining whether the indicator is set (614). Responsive to a determination that the indicator is not set, the method 600 includes enabling user access (618) to the electronic device. Responsive to a determination that the indicator is set, the method 600 includes storing the decrypted identifier as another trusted identifier (616). Additionally, the method 600 includes enabling user access (618) to the electronic device.

In various examples, the method 600 includes detecting the another electronic device via a port (e.g., the port 208, 304, 404). The method 600 also includes establishing the side-band communications channel via the port utilizing the techniques described above with respect to FIG. 1 or 3, for example. The method 600 includes receiving the encrypted signal via the port. In various examples, the encrypted signal includes a response to a challenge from the electronic device, an encrypted identifier, an encrypted credential, or a combination thereof. For example, responsive to the challenge from the electronic device, the another electronic device transmits the encrypted signal including the response to the challenge, the encrypted identifier, the encrypted credential, or the combination thereof, formatted according to a specified protocol. The method 600 includes decrypting the encrypted signal utilizing the techniques described above with respect to FIG. 3, the specified protocol, or a combination thereof, for example. In some examples, the method 600 includes determining whether the decrypted identifier of the encrypted signal is the trusted identifier by comparing the decrypted identifier to the trusted identifier stored to a storage device (e.g., the storage device 210, 306, 406). In some examples, the method 600 includes determining whether the decrypted credential of the another encrypted signal is the trusted credential by comparing the decrypted credential to the trusted credential stored to the storage device (e.g., the storage device 210, 306, 406).

Utilizing the method 600 to determine that the decrypted identifier is another trusted identifier and to store the another trusted identifier, the electronic device enhances a number of trusted peripheral devices authorized to wake the electronic device to include multiple peripheral devices. The multiple peripheral devices include integrated peripheral devices, non-integrated peripheral devices, or a combination thereof. By utilizing the side-band communications channel of the port to establish encrypted communication and the secure storage device to store trusted identifiers and trusted user credentials, the electronic device enhances user productivity by reducing an amount of time to register the another electronic device as a trusted peripheral device.

While components and circuits of the electronic device 100, 202, 204, 300, 400 described herein are shown as discrete components and circuits, in other examples, the components, circuits, or a combination thereof are integrated circuits (ICs) that perform some or all the actions attributed to the discrete components, circuits, or combination thereof, included in the IC. Except where infeasible (e.g., block functionality of a component, a circuit, or a combination thereof), the components, circuits, or a combination thereof, may be included in an IC.

Unless infeasible, some or all of the method 500, 600 may be performed by the electronic device concurrently or in different sequences and by circuitry of the electronic device, execution of machine-readable instructions of the electronic device, or a combination thereof. For example, the method 500, 600 is implemented by machine-readable instructions stored to a storage device (e.g., the storage device 210, 306, 406, or another storage device not explicitly shown) of the electronic device, circuitry (some of which is not explicitly shown) of the electronic device, or a combination thereof. A controller (e.g., the 206, 302, 402) of the electronic device executes the machine-readable instructions to perform some or all of the method 500, 600, for example. In another example, comparators (not explicitly shown) couple to the controller. The comparators determine whether received values (e.g., a decrypted identifier, an encrypted user credential) are equivalent to stored values (e.g., the trusted identifier 314, 418, the trusted user credential 316, 420) and the controller determines a subsequent action based on a result of the comparison, for example.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:
1. An electronic device, comprising:
a port; and
a controller to:
    detect that a second electronic device is coupled to the port;
    cause transmission of a first signal to the second electronic device via a side-band communications channel of the port, the first signal challenging the second electronic device to provide an encrypted identifier associated with the second electronic device;
    receive the encrypted identifier from the second electronic device via the side-band communications channel of the port;
    determine that the encrypted identifier received from the second electronic device via the side-band communications channel of the port is equivalent to a trusted identifier retrieved from a storage device;
    responsive to determining that the encrypted identifier is equivalent to the trusted identifier, cause transmission of a second signal to the second electronic device via the side-band communications channel of the port, the second signal challenging the second electronic device to provide an encrypted user credential;
    receive the encrypted user credential from the second electronic device via the side-band communications channel of the port;
    determine that the encrypted user credential received from the second electronic device via the side-band communications channel of the port is equivalent to a trusted user credential retrieved from the storage device; and
    responsive to determining that the encrypted user credential is equivalent to the trusted user credential, enable a user to access the electronic device.

2. The electronic device of claim 1, wherein the encrypted user credential comprises data generated by a biometric sensor of the second electronic device.

3. The electronic device of claim 1, wherein the port comprises a universal serial bus (USB) Type-C port.

4. The electronic device of claim 3, wherein the side-band communications channel of the port comprises a power delivery channel of the USB Type-C port.

5. The electronic device of claim 1, wherein the encrypted user credential comprises a fingerprint, a handprint, an iris scan, a retinal scan, a facial pattern, or a voice pattern.

6. The electronic device of claim 1, wherein the storage device is coupled to the controller via a private serial peripheral interface (SPI).

7. The electronic device of claim 6, wherein the electronic device comprises the storage device.

8. The electronic device of claim 1, wherein the controller is to wake the electronic device responsive to determining that the encrypted user credential is equivalent to the trusted user credential.

9. A non-transitory computer-readable storage medium comprising instructions stored thereon that, when executed by a processor of a computing device, cause the computing device to:
    detect that a second computing device is coupled to a port of the computing device;
    transmit a first signal to the second computing device via a side-band communications channel of the port to request an encrypted identifier associated with the second computing device;
    receive the encrypted identifier from the second computing device via the side-band communications channel of the port;
    determine that the encrypted identifier received from the second computing device is equivalent to a trusted identifier;
    responsive to determining that the encrypted identifier is equivalent to the trusted identifier, transmit a second signal to the second computing device via the side-band communications channel of the port to request an encrypted user credential from the second computing device;

receive the encrypted user credential from the second computing device via the side-band communications channel of the port;

determine that the encrypted user credential received from the second computing device is equivalent to a trusted user credential; and responsive to determining that the encrypted user credential is equivalent to the trusted user credential, enable a user to access the computing device.

10. The non-transitory computer-readable storage medium of claim 9, wherein the instructions, when executed by the processor of the computing device, further cause the computing device to retrieve the trusted identifier and the trusted user credential from a storage device via private serial peripheral interface (SPI).

11. The non-transitory computer-readable storage medium of claim 9, wherein the encrypted user credential comprises data generated by a biometric sensor of the second computing device.

12. The non-transitory computer-readable storage medium of claim 11, wherein the data generated by the biometric sensor of the second computing device comprises a fingerprint, a handprint, an iris scan, a retinal scan, a facial pattern, or a voice pattern.

13. The non-transitory computer-readable storage medium of claim 9, wherein:

the port comprises a universal serial bus (USB) Type-C port; and the side-band communications channel of the port comprises a power delivery channel of the USB Type-C port.

14. The non-transitory computer-readable storage medium of claim 9, wherein the instructions, when executed by the processor of the computing device, further cause the computing device to wake the computing device responsive to determining that the encrypted user credential is equivalent to the trusted user credential.

15. A method for performing by a computing device, the method comprising:

transmitting a first signal to a second computing device via a side-band communications channel of a port of the computing device to request an encrypted identifier associated with the second computing device;

receiving the encrypted identifier from the second computing device via the side-band communications channel of the port;

determining that the encrypted identifier received from the second computing device is equivalent to a trusted identifier;

responsive to determining that the encrypted identifier is equivalent to the trusted identifier, transmitting a second signal to the second computing device via the side-band communications channel of the port to request an encrypted user credential from the second computing device;

receiving the encrypted user credential from the second computing device via the side-band communications channel of the port;

determining that the encrypted user credential received from the second computing device is equivalent to a trusted user credential; and responsive to determining that the encrypted user credential is equivalent to the trusted user credential, enabling a user to access the computing device.

16. The method of claim 15, further comprising:

retrieving the trusted identifier from a storage device via a private serial peripheral interface (SPI); and retrieving the trusted user credential from the storage device via the private SPI.

17. The method of claim 15, wherein the encrypted user credential comprises data generated by a biometric sensor of the second computing device.

18. The method of claim 15, wherein the encrypted user credential comprises a fingerprint, a handprint, an iris scan, a retinal scan, a facial pattern, or a voice pattern associated with the user.

19. The method of claim 15, further comprising waking the computing device responsive to determining that the encrypted user credential is equivalent to the trusted user credential.

20. The method of claim 15, wherein:

the port comprises a universal serial bus (USB) Type-C port; and the side-band communications channel of the port comprises a power delivery channel of the USB Type-C port.

* * * * *